United States Patent [19]

Kamei et al.

[11] Patent Number: 5,301,227
[45] Date of Patent: Apr. 5, 1994

[54] AUTOMATIC DIAL TELEPHONE

[75] Inventors: Shoichi Kamei, Hirakata; Masayuki Iida; Shinichi Tsurufuji, both of Yawata; Hiroki Ohnishi, Hirakata; Kazumi Ohkura, Higashiosaka, all of Japan

[73] Assignee: Sanyo Electric Co., Ltd., Moriguchi, Japan

[21] Appl. No.: 896,414

[22] Filed: Jun. 10, 1992

Related U.S. Application Data

[63] Continuation of Ser. No. 510,626, Apr. 17, 1990, abandoned.

[30] Foreign Application Priority Data

| Apr. 17, 1989 | [JP] | Japan | 1-96706 |
| Apr. 20, 1989 | [JP] | Japan | 1-100780 |
| May 12, 1989 | [JP] | Japan | 1-119103 |
| Jul. 20, 1989 | [JP] | Japan | 1-187795 |

[51] Int. Cl.⁵ .................. H04M 1/26; H04M 1/56
[52] U.S. Cl. ........................... 379/88; 379/58; 379/63; 379/355; 381/43
[58] Field of Search ............ 379/88, 89, 67, 355, 379/354, 58, 59, 63; 381/43

[56] References Cited

U.S. PATENT DOCUMENTS

| 4,164,025 | 8/1979 | Dubnowski et al. | 364/900 |
| 4,348,550 | 9/1982 | Pirz et al. | 379/357 |
| 4,797,929 | 1/1989 | Gerson et al. | 381/43 |
| 4,873,714 | 10/1989 | Ishii et al. | 379/88 |
| 4,928,302 | 5/1990 | Kaneuchi et al. | 379/88 |
| 4,945,557 | 7/1990 | Kaneuchi et al. | 379/67 |
| 5,007,081 | 4/1991 | Schmuckal et al. | 379/354 |

FOREIGN PATENT DOCUMENTS

| 0105558 | 5/1987 | Japan | 379/355 |
| WO87/07460 | 12/1987 | World Int. Prop. O. | 379/355 |

OTHER PUBLICATIONS

"Voice Dialer", M. Immendofer, *Electrical Communication*, vol. 59, No. 3, Published May 1985, pp. 281-285.
"Talking to technology", P. Brennan et al., *Telesis* 1988 cone, Bell-Northern Research, Ltd. (Canada), pp. 45-50.
"Isolated and Connected Word Recognition-Theory and Selected Applications", L. R. Rabiner et al., *IEEE Trans. on Commun.*, vol. COM-29, No. 5, May 1981, pp. 621-659.

*Primary Examiner*—Thomas W. Brown
*Attorney, Agent, or Firm*—Thomas R. Morrison

[57] ABSTRACT

In an automatic dial telephone that is usuable in a motor vehicle, when a voice input is provided during a period in which input of the names of called parties is awaited, a voice pattern of the name of the called party is compared with reference patterns of called parties stored in reference pattern storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

13 Claims, 14 Drawing Sheets

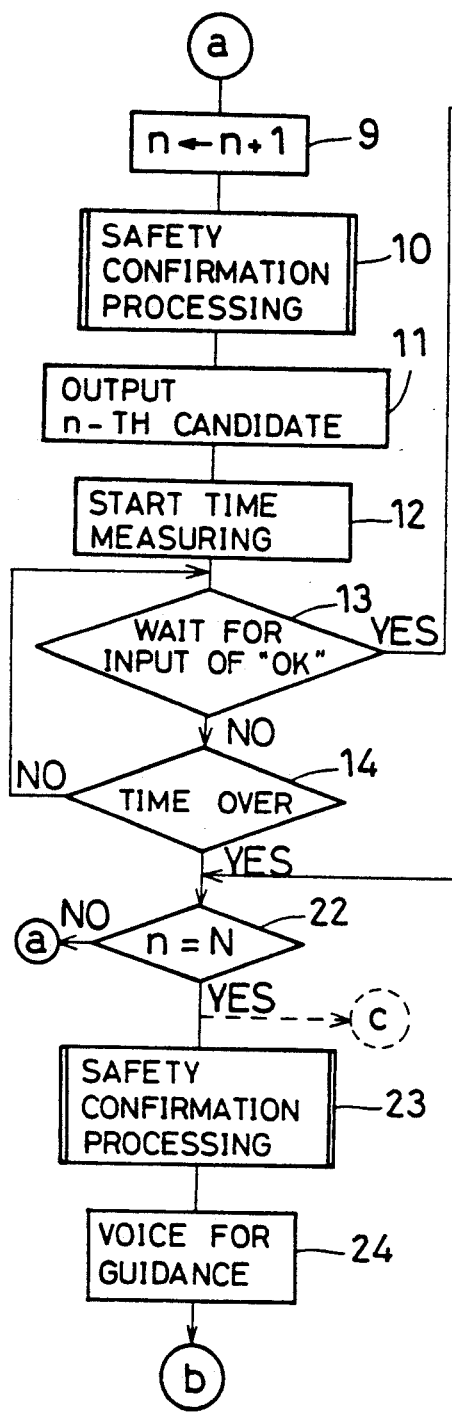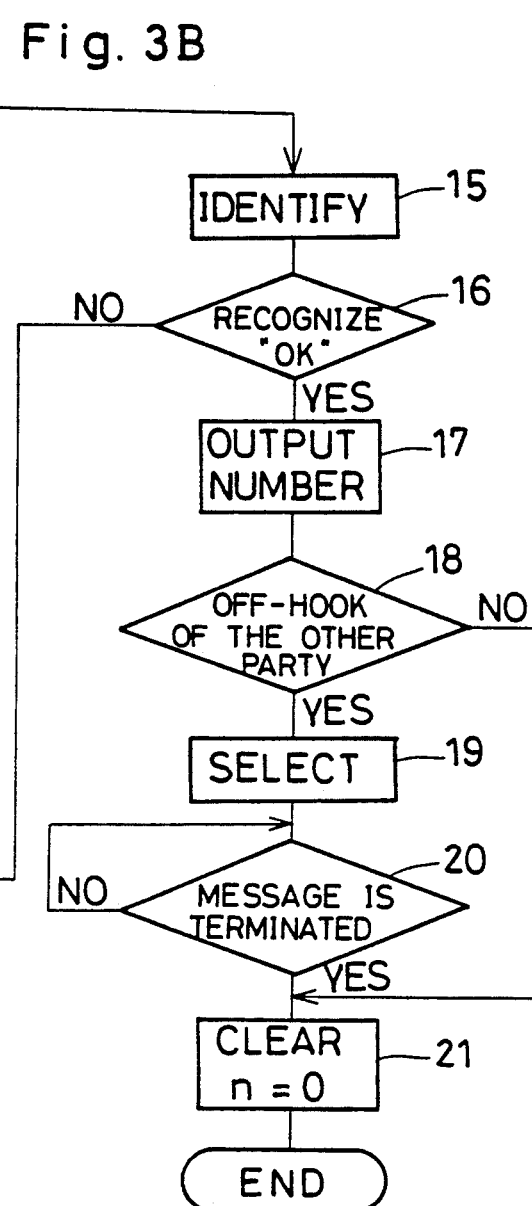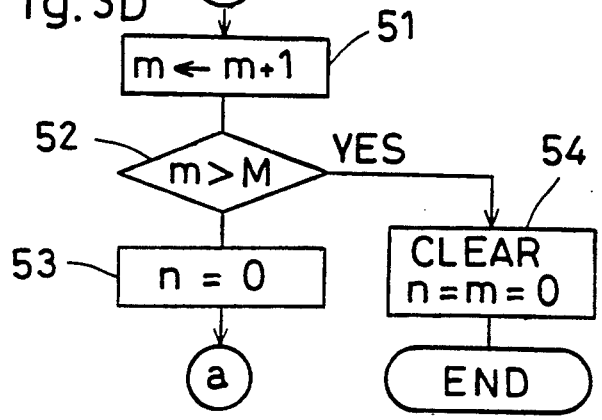

AUTOMATIC DIAL TELEPHONE

This is a continuation of co-pending application Ser. No. 07/510,626 filed on Apr. 17, 1990 now abandoned.

BACKGROUND OF THE INVENTION

1. Field of the Invention

The present invention relates generally to automatic dial telephones, and more particularly, to an automatic dial telephone for automatically dialing numbers by speech recognition or a manual operation.

2. Description of the Prior Art

In recent years, with the improvement in recognition rate in a voice recognition unit, a telephone capable of automatically dialing numbers in respone to voice command has been put into practice (for example, Japanese Patent Laid-Open Gazette No. 81152/1987).

For example, as a voice recognition processing method in such an automatic dial telephone, a two-step recognition processing method has been generally employed in which the name of a called party is recognized in the first step and a command word such as "CANCEL" or "DIAL" is recognized in the second step.

More specifically, the name of a called party spoken by a user is recognized by speech recognition, and the results of this recognition are displayed by visual or audible means. At this display, the user inputs a command word for confirmation "DIAL" when the result of the recognition of the name of the called party is correct. If this inputted voice is recognized by the telephone as the command word for confirmation, a telephone number of the called party is dialled.

On the other hand, when the result of the recognition of the name of the called party is not correct, the user inputs a command word for cancellation "CANCEL". If this inputted voice is recognized by the telephone as the command word for cancellation, the automatic dial telephone returns to a wait state in which the user must the name of the called party.

The above described voice recognition processing method has the disadvantage in that the user must input the command word for cancellation and repeat the name of called party every time the name of the called party is erroneously recognized, thereby imposing a large burden on the user.

Such errors are liable to occur due to external noise because the name of the called party, and the command words are inputted by voice. This possibility is high, particularly if the automatic dial telephone is being used in a vehicle such as a car.

SUMMARY OF THE INVENTION

An object of the present invention is to provide an automatic dial telephone in which the burden on a user is reduced.

Another object of the present invention is to bypass relatively quickly any error which may be due to external noise.

Still another object of the present invention is to provide an automatic dial telephone that when used in a moving vehicle is capable of automatically dialing numbers under safe driving conditions only.

Briefly stated, in an automatic dial telephone, that is also usable in a motor vehicle, a user voice inputs a name of a party to be called. A voice pattern of the name of the party to be called is compared with reference patterns of parties to be called, stored in a reference pattern storage, to determine the degree of similarity therebetween. The names of candidate parties to be called are output to the user in order of decreasing similarity. Each time the name of a called party is output, the automatic dial telephone waits a predetermined time for the user to input a command word for confirmation. When a voice confirmation command is input and recognized during this waiting period, a telephone number corresponding to the name of the called party is supplied to a telephone. Consequently, the command word for confirmation may be input only if the name of the party that is output is the one the user desires to call. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

According to an embodiment of the invention, there is provided an automatic dial telephone by which a user can voice initiate a call to a selected station and/or party, the automatic dial telephone comprises a memory for storing a plurality of discrete voice reference patterns each discrete voice reference pattern representing a party to be called. There is another memory for storing a telephone number for each party to be called. There is yet another memory for storing a user voice reference pattern representing a command for confirmation. Also included is a device for comparing a reference pattern of a name of a party to be called, which is voice input, with the stored plurality of discrete voice reference patterns similar thereto, to obtain a list of discrete voice reference patterns similar to the voice input pattern. There is an output device for outputting audible signals, representing the discrete voice reference patterns from the list of discrete voice reference patterns, in order of descending similarity to the voice input pattern. The output device produces a pause following each audible signal that is output to allow a user time to input a user voice signal command for confirmation of the identity of the party to be called. Once the command for confirmation is input, the output device stops outputting audible signals. Lastly, the telephone of this embodiment has a device for selecting and transmitting, as a signal, the telephone number of the identified party to be called.

According to a feature of the embodiment of the invention, there is also provided a device for comparing a voice input pattern, denotive of a specific user voice signal command, with the user voice reference pattern similar thereto. Also included is a device for determining the degree of similarity between the voice input pattern, denotive of the specific party to be called, and of the specific user voice signal command, respectively with each of the stored plurality of discrete voice reference patterns representing parties to be called and the user voice reference pattern of command words. The device for determining also determines which of the voice reference patterns has a degree of similarity to the voice input pattern that is within a predetermined threshold. When the degree of similarity is within the predetermined threshold, a device selects and transmits, as a signal, the telephone number of the identified party to be called. When the degree of similarity is outside the predetermined threshold, a device repeats the comparison of the input voice pattern and the stored voice reference patterns.

According to a further feature of the embodiment of the invention, there is also provided a plurality of commands including commands for confirmation and for off-hook. Also included is a device for orienting the telephone to an off-hook condition when a user voice input pattern for off-hook is recognized. There is also a device for placing the telephone on-hook when a user voice signal, denotive of a specific party to be called, is not input within a first predetermined pause period following the off-hook command. There is also a device for comparing a voice input pattern, denotive of a specific party to be called, with the discrete voice reference patterns similar thereto when the telephone is in an off-hook state. Finally, there is a device for returning the telephone to an on-hook condition when the user voice reference pattern command for confirmation is not input during the second pause period, following the output of the audible signal.

According to a still further feature of the embodiment of the invention, there is also provided a device for comparing a voice input pattern, denotive of a command, with the plurality of reference patterns. Also included is a first determining device for determining a degree of similarity between the stored voice reference pattern command for off-hook and the voice input pattern, including a device for determining that the degree of similarity is within a predetermined threshold. The first determining device also includes a device for returning the telephone to the on-hook condition when the degree of similarity is outside the predetermined threshold. There is a second determining device for determining the degree of similarity between the stored user voice reference pattern, representing a command for confirmation, and the voice signal command, including a device for determining that the degree of similarity is within a predetermined threshold. The second determining device also includes a device for returning the telephone to the on-hook condition when the degree of similarity is outside the predetermined threshold.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A, 3B, 3C and 3D are flow charts showing the call by a control portion of the parent set;

DESCRIPTION OF THE PREFERRED EMBODIMENTS

Figure 1:
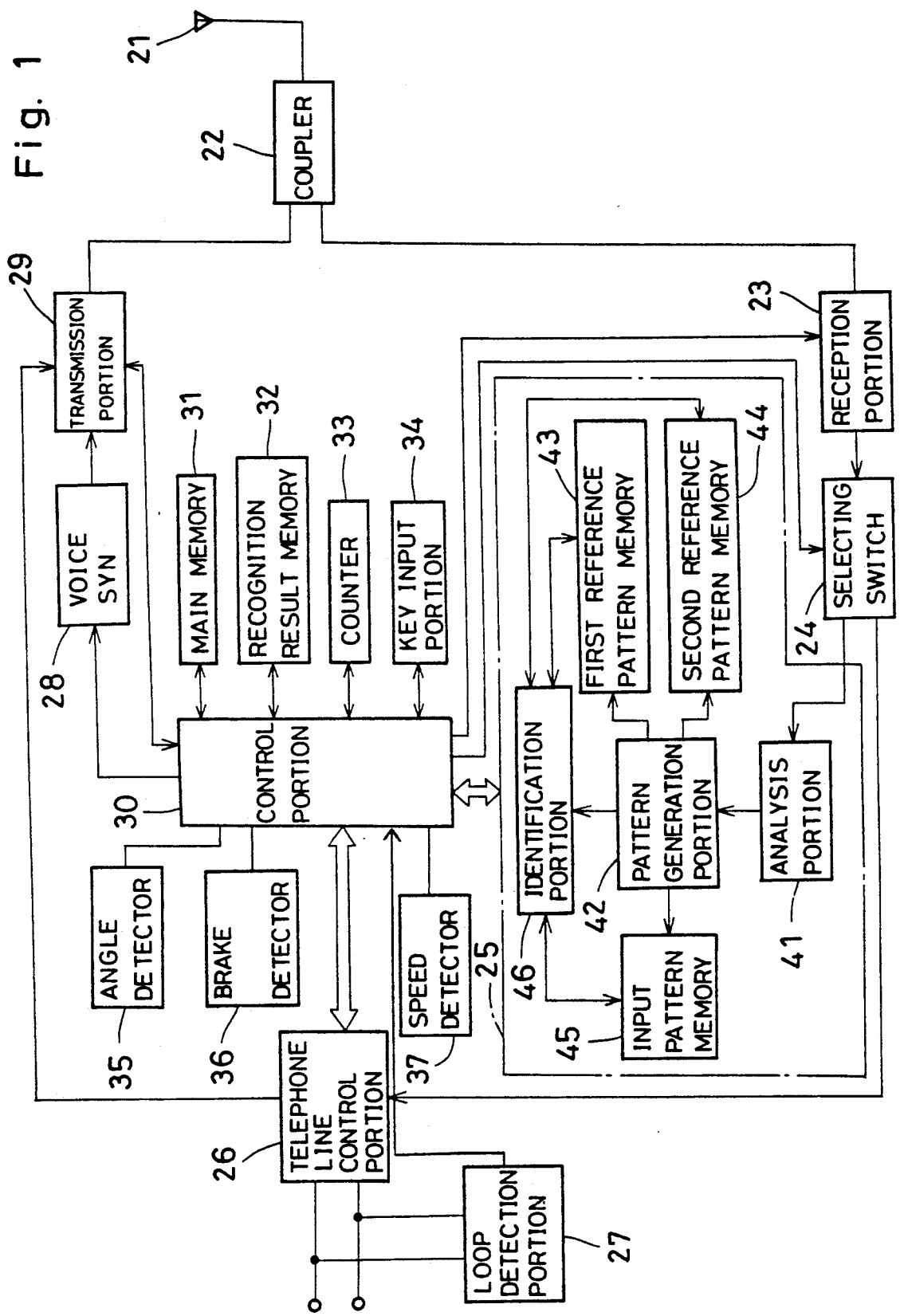
FIG. 1 is a block diagram showing the electrical construction of a parent set of a wireless automatic dial telephone.
Figure 2:
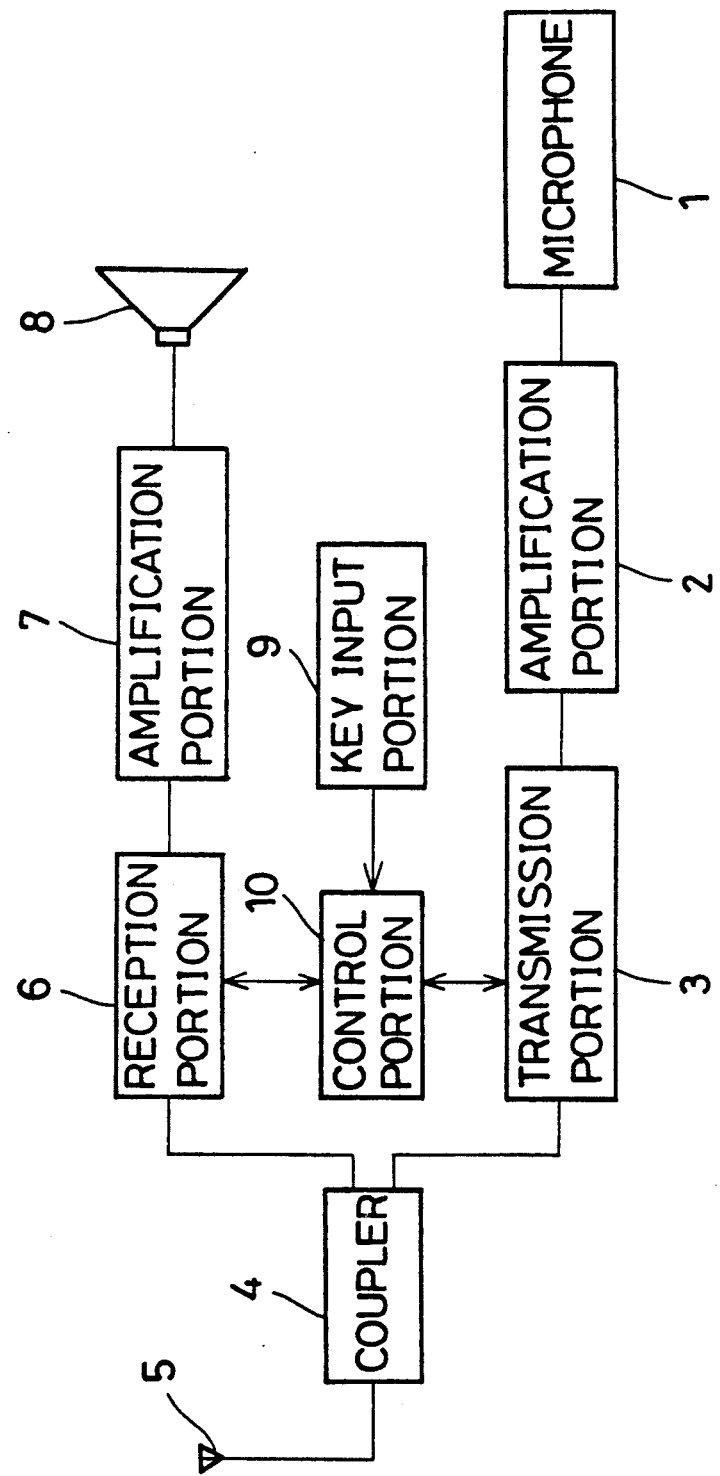
FIG. 2 is a block diagram showing the electrical construction of a child set of the wireless automatic dial telephone.

FIGS. 1 and 2 show the electrical construction of a wireless automatic dial telephone, where FIG. 1 shows a parent set and FIG. 2 shows a child set.

Referring to FIG. 2, the child set comprises a microphone 1 for inputting a voice, an amplification portion 2 for amplifying a voice signal from the microphone 1, a transmission portion 3 comprising a modulator circuit for modulating a carrier wave by the voice signal amplified and an amplifier circuit for amplifying a modulated wave outputted from the modulator circuit, an antenna coupler 4, an antenna 5 for transmission or reception, a reception portion 6 including an amplifier circuit for amplifying the modulated wave received and a demodulator circuit for demodulating the modulated wave amplified, an amplification portion 7 for amplifying a voice signal reproduced by the reception portion 6, a loudspeaker 8 for outputting audibly the amplified voice signal, a key pad input portion 9 having a ten-key and various function keys, and a control portion 10 for controlling the transmission portion 3, the reception portion 6 and the key input portion 9.

Referring now to FIG. 1 parent set comprises a loop detection portion 27 for detecting the state of a telephone line loop, a voice recognition portion 25 for automatically dialing numbers by voice input, a telephone line control portion 26 for supplying to a telephone line a telephone number corresponding to a voice recognized called party by the voice recognition portion 25 and supplying to the telephone line a transmission or reception signal, an antenna 21 for transmission or reception, an antenna coupler 22, a reception portion 23 comprising an amplifier circuit for amplifying a modulated wave received and a demodulator circuit for demodulating the modulated wave amplified, a selecting switch 24 for selecting either the telephone line control portion 26 the voice recognition portion 25 to receive the voice signal reproduced by the reception portion 23, a key input portion 34 having a ten-key pad and various function keys, a voice synthesis portion 28 for generating various synthetic voices, a transmission portion 29 including a modulator circuit for modulating a carrier wave by an output signal of the voice synthesis portion 28 or the reception signal from the telephone line control portion 26 and an amplifier circuit for amplifying a modulated wave from the modulator circuit, and a control portion 30 for controlling these equipments.

The speech recognition portion 25 comprises an analysis portion 41 for analyzing the frequency spectrum of the voice signal inputted, a voice pattern generation portion 42 for generating a group of time series of the voice spectrum, that is, a voice pattern based on results of the analysis by the analysis portion 41, an inputted voice pattern memory 45 for storing the voice pattern generated by the voice pattern generation portion 42, a first reference pattern memory 43 for storing reference voice patterns of the names of a plurality of called parties, a second reference pattern memory 44 for storing reference voice patterns of a plurality of command words, and an identification portion 46 for comparing the voice pattern outputted from the voice pattern generation portion 42 with the reference patterns to identify the degrees of similarity between the patterns.

The control portion 30 controls a main memory 31 for storing a program and required data, a recognition result memory 32 for storing the names of the called parties in the order of decreasing degree of similarity in accordance with speech recognition of the name of the called party, and a counter 33 for measuring time.

Furthermore, a detection signal of a rotation angle detector 35 for reporting the angle of rotation of a steering wheel of a car equipped with this telephone, a detection signal of a brake detector 36 for reporting an operating state of the brakes and a detection signal of a speed detector 37 for reporting the current speed of a car are inputted to the control portion 30.

Before a user is able to automatically dial numbers by voice using this wireless automatic dial telephone, the command words and the names of the called parties must be trained into the telephone. The command words comprise a command word for bringing the telephone into an off-hook state "OFF-HOOK", a command word for configuration "OK" and the like.

The command words and the names of the called parties are trained into the telephone in the following manner. First, a training key provided in the key input portion 9 in the child set is depressed. A training operation start signal is outputted from the control portion 10 in the child set. The carrier wave is modulated by this training operation start signal in the transmission portion 3, and the modulated wave is transmitted through the coupler 4 and the antenna 5. This modulated wave is received by the antenna 21 in the parent set, to be sent to the reception portion 23 through the coupler 22. In the reception portion 23, the modulated signal received is demodulated and amplified. The training operation start signal reproduced in the reception portion 23 is sent to the control portion 30, initiating a training operation. As an alternate training key of the key input portion 34 in the parent set may be to initiate training. In this case, an output of the key input portion 34 is provided to the control portion 30 in the parent set, initiating the training operation.

Then, the command words and the names of the called parties are inputted by the microphone 1 of the child set. The voice signal outputted from the microphone 1 is amplified in the amplification portion 2 and then, sent to the transmission portion 3. In the transmission portion 3, the carrier wave is modulated by the voice signal, and the modulated wave is amplified. The modulated wave outputted from the transmission portion 3 is transmitted through the coupler 4 and the antenna 5.

This modulated wave is received by the antenna 21 in the parent set, to be sent to the reception portion 23 through the coupler 22. In the reception portion 23, the modulated signal received is demodulated and amplified. The voice signal reproduced in the reception portion 23 is sent to the speech recognition portion 25 through the selecting switch 24.

In the speech recognition portion 25, the frequency spectrum of the voice signal is first analyzed by the voice analysis portion 41. A voice pattern is generated by the pattern generation portion 42, based on the results of this analysis. This voice pattern is stored in the first reference pattern memory 43 if the inputted voice is the name of a called party. The voice pattern 75 stored in the second reference pattern memory 44 if the inputted voice is a command word.

By such an operation, the voice patterns of the names of all the called parties and the voice patterns of all the command words are stored in the first or second reference pattern memories 43 or 44.

When training the names of called parties, a telephone number for each of the called parties is inputted using the ten key pad of either key input 9 or 34 in the parent and child sets following the voice input of the name of the called party, thus storing a telephone number with each of the called parties trained in the main memory 31.

Referring now also to FIGS. 3A, 3B, 3C and 3D, to process a call using control 30 the user turns the power supply of the child set on and then, inputs a command word for off-hook "OFF-HOOK" using the microphone 1. When the command word for off-hook is inputted to the microphone 1 (step 1), the resultant voice signal outputted from the microphone 1 is amplified and modulates a carrier wave. Then, the modulated wave is transmitted from the antenna 5 in the child set.

This modulated wave is received by the antenna 21 in the parent set and demodulated. The voice signal reproduced is sent to the voice recognition portion 25 through the selecting switch 24 to perform voice recognition processing (step 2).

In the voice recognition portion 25, the frequency spectrum of the voice signal inputted is first analyzed by the voice analysis portion 41. A voice pattern is generated by the pattern generation portion 42 based on the results of this analysis. The voice pattern generated is stored in the input pattern memory 45. In the identification portion 46, the voice pattern generated is compared with reference patterns of all command words stored in the second reference pattern memory 44, to identify the degrees of similarity therebetween.

In the identification portion 46, when the inputted voice is recognized to be "OFF-HOOK" (step 3), a direct-current loop is formed by the telephone line control portion 26, resulting in an off-hook state (step 4). Thereafter, safety confirmation processing is performed for examining whether or not driving conditions are safe with respect to a telephone operation performed by a user (step 5). The details of this processing will be described later.

If it is confirmed that the driving conditions are safe during safety confirmation processing, a synthetic voice signal representing a voice guidance for urging the user to input the name of a called party, is synthesized in the voice synthesis portion 28. The signal maybe, for example, "input the name of the other party". This signal is sent to the transmission portion 29, and the carrier wave is modulated by this signal. The modulated wave is amplified and then, transmitted through the antenna 21.

This modulated wave is received by the antenna 5 in the child set, to be demodulated. The synthetic voice signal reproduced is amplified and then, sent to the loudspeaker 8. The voice for guidance is then outputted from the loudspeaker 8 (step 6).

Thereafter, if the user inputs the name of the called party, for example, "SANYO" at the microphone 1 (step 7), the voice signal is received in the parent set by radio communication, and the degrees of similarity of this voice signal to reference patterns of all called parties in the first reference pattern memory 43 are calculated by the voice recognition portion 25. The names of the called parties are stored in the recognition result memory 32 in the order of decreasing degree of similarity (step 8).

Thereafter, a candidate order n is updated by one (step 9). The candidate order n becomes one the first time because it is set to zero during initialization.

Safety confirmation processing is then performed (step 10). If the safety is confirmed a called party which is the n-th candidate of the called parties stored in the recognition result memory 32 is read out. This causes voice synthesis portion 28 to output a synthesized voice signal representing the first candidate, which is the name of the stored called party having the largest degree of similarity to the input called party. This name is then outputted from the loudspeaker 8 in the child set (step 11).

Futhermore, a measuring operation for measuring predetermined time is started (step 12). This predetermined time is set to a suitable time period during which the user can input a command word for confirmation "OK" with respect to voice output of the name of the called party. The user inputs the command word for confirmation "OK" from that the microphone 1 in the child set only if the name of the called party outputted is the same as that inputted by the user.

If the user inputs the command word for confirmation "OK" from the microphone 1 in the child set within the above described predetermined time period (step 13), the voice signal is received in the parent set through radio communication, and the inputted voice pattern is compared with the reference patterns of all the command words in the second reference pattern memory 44 by the voice recognition portion 25 (step 15). If the inputted voice is recognized to be "OK" (step 16), a telephone number corresponding to the name of the called party outputted in the above described step 11 is read out from the main memory 31, to be sent to the telephone through the telephone line control portion 26 (step 17). Consequently, a phone call is made to the called party.

If the off-hook of the called party is detected by the loop detector 27 within a constant time period (step 18), the selecting switch 24 is switched such that the voice signal inputted to the child set is supplied to the telephone line control portion 26 (step 19). Consequently, a telephone call to the called party is made. When the telephone call is terminated (step 20), the contents of the main memory 31 are cleared and the candidate order n is reset (n=0) (step 21), thereby terminating this processing.

If a voice is not inputted within a predetermined time period after the time measuring operation was started in the above described step 12 (step 14) and a voice is inputted but the inputted voice is not recognized to be "OK" (step 16), it is determined whether or not the name of the other party outputted in the above described step 11 is a final candidate (n=N) (step 22).

If it is not the final candidate (n<N), the program is returned to the step 9. In the step 9, the candidate order n is updated by one. Thereafter, safety confirmation processing is performed (step 23). If the safety is confirmed, the name of a called party which is the n-th candidate, that is, the next candidate is read out from the recognition result memory 32. A synthetic voice signal corresponding to this called party is outputted from the voice synthesis portion 28, and this synthetic voice is outputted from the loudspeaker 8 in the child set on the basis of the synthetic voice signal (step 11). In addition, the time measuring operation is started (step 12).

The telephone is in a state in which it awaits the command word for confirmation "OK" within a predetermined time period (steps 13 and 14). If a voice is inputted during this wait state and the inputted voice is recognized to be "OK" after the command for confirmation as a result of the speech recognition (steps 13, 15 and 16), processing for automatic dialing and a telephone call is performed (steps 17 to 21).

If a voice is not inputted in a state in which the command word for confirmation "OK" is awaited (step 14) and a voice is inputted but the inputted voice is not recognized to be the command word for confirmation "OK" (step 16), it is determined whether or not the name of the other party outputted this time is a final candidate (step 22). If the name of the other party outputted this time is not the final candidate (n<N), the program is returned to the step 9.

If the name of the called party outputted this time is the final candidate (n=N), safety confirmation processing is performed (step 23) and then, a voice for guidance asks the user whether or not to output the names of the called parties again in the order of candidacy, for example, "Will you output the name of the called party again?" is outputted (step 24). In addition, predetermined time starts to be measured (step 25). This predetermined time is set to a suitable time period during which the user can input the command word for confirmation "OK" with respect to the output of the voice for guidance. The user inputs the command word for confirmation "OK" at the microphone 1 in the child set after the command for confirmation only if it is desired to output the name of the called party again.

If the user inputs the command word for confirmation "OK" within the above described predetermined time period (step 26), its voice signal is received in the parent set through radio communication, to be compared with the reference patterns of the command words in the second reference pattern memory 44 in the voice recognition portion 25 (step 28). If the inputted voice is recognized to be "OK" (step 29), the candidate order n is reset (step 30). The program is returned to the above described step 9. In the step 9, outputting the name of the called party which is the next candidate, waiting for the command word for confirmation to be inputted and outputting a telephone number, in a case where the command word for confirmation is inputted, is performed again.

If a voice is not inputted within a predetermined time period after the time measuring operation is started in step 25 and a voice is inputted but the inputted voice is not recognized to be "OK" (YES in step 27 or NO in step 29), the contents of the recognition result memory 32 are cleared and the candidate order n is reset (step 31), thereby terminating this procedure.

Figure 4:
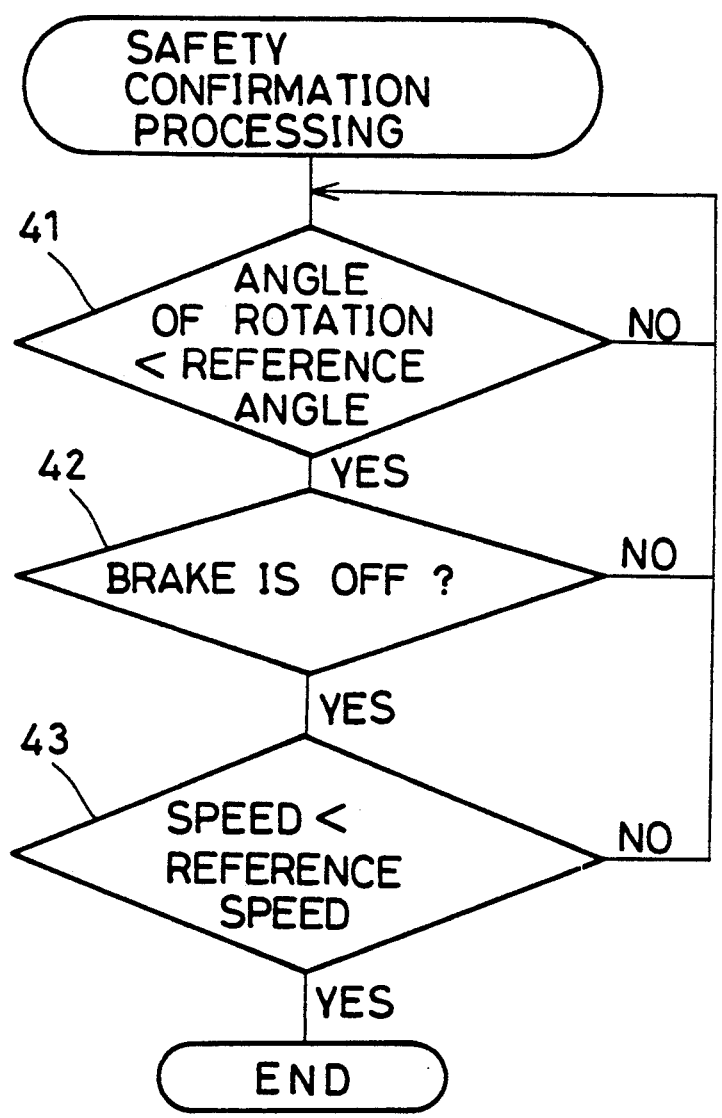
FIG. 4 is a flow chart showing the safety confirmation processing.

FIG. 4 shows the details of safety confirmation procedure. In this procedure, it is first determined whether or not the angle of rotation detected by the rotation angle detector 35 is smaller than a predetermined reference angle (step 41).

If the angle of rotation detected is smaller than the reference angle, it is then determined whether or not a brake is off based on an output of an operation detector 36 (step 42).

If the brake is off, it is determined whether or not the speed detected by the speed detector 37 is smaller than a predetermined reference speed (step 43). If the speed detected is smaller than the reference speed, this procedure is terminated. The program proceeds to the step 6, 11 or 24 of FIGS. 3A and 3B for voice output.

The program is returned to the step 41 if the angle of rotation detected is larger than the reference angle in the above described step 41, the brake is on in the above described step 42, and the detected speed is larger than the reference speed in the above described step 43.

This inhibits the voice output in the step 6, 11 or 24 (see FIGS. 3A and 3B) until the angle of rotation detected is smaller than the reference angle, the brake is off and the detected speed is smaller than the reference speed.

Although in the step 2 according to the above described embodiment, the inputted voice pattern is compared with the reference patterns of all the command words stored in the second reference pattern memory 44, in another embodiment the inputted voice pattern may be compared with only the reference pattern of the command word for off-hook stored in the second reference pattern memory 44.

Furthermore, although reference voice patterns of the other parties and the reference voice patterns of the command words are stored in separate memories 43 and 44, in another embodiment they may be stored in a single reference pattern memory.

Additionally, although in the above described step 8, the degrees of similarity of the inputted voice pattern to the reference patterns of all the called parties in the first reference pattern memory 43 are calculated, the degrees of similarity of the inputted voice pattern to the reference patterns of all the called parties may be limited to within a predetermined range of called parties previously specified.

For example, the called parties are divided into predetermined groups, the reference patterns of the called parties are stored in the first reference pattern memory 43 for each group, and data for specifying the name of a group is inputted by key, voice or the like before a telephone operation is started. In the step 8, the degrees of similarity of the inputted voice pattern to the reference patterns of all the called parties within a range of the specified group among all reference voice patterns of the stored in the first reference pattern memory 43 are calculated.

Furthermore, if there are a plurality of users, the reference patterns of the called parties are stored in the first reference pattern memory 43 for each user, and data for specifying the name of a current user is inputted by key, voice or the like before a telephone operation is started. In the step 8, the degrees of similarity of the inputted voice pattern to the standard patterns of all the called parties are calculated with respect to the user specified.

Additionally, if there are a plurality of users, the reference patterns of the called parties are stored in the first reference pattern memory 43 for each user and predetermined group. Data for specifying the name of a user and data for specifying the name of a group are inputted by key, voice or the like before a telephone operation is started. In the step 8, the degree of similarity of the inputted voice pattern to all the reference patterns of all called parties with respect to the specified user and the specified group of called parties from among reference voice patterns of all called parties stored in the first reference pattern memory 43 are calculated.

Furthermore, in the above described embodiment, if the names of the called parties, which from the first candidate to the final candidate are sequentially outputted and a command word is not inputted or a command word is inputted but is not recognized to be "OK", the user is asked whether or not the names of the called parties are to be outputted again beginning with the first candidate (see steps 22 to 24). However, output of the names of the called parties may be repeated only until the number m of repetitions of output of the called parties receives a predetermined m number of times, regardless of the intention of the user.

The procedure of processing in this case is represented by FIG. 3D. More specifically, if it is determined in the step 22 that the name of the called party outputted this time is the final candidate (n=Nm), the number m of repetitions is updated by one (step 51). The number m of repetitions is initially set to zero.

It is determined whether or not the number m of repetitions is larger than the predetermined number M of times (step 52). If the number m of repetitions is smaller than the predetermined number M of times, the candidate order n is reset (step 53) and the program is returned to the step 9. Consequently, the names of the called parties are sequentially outputted beginning with the first candidate, until the command word for confirmation "OK" is inputted and, a corresponding telephone number is outputted.

If the names of the called parties, which are the first candidate to tye final candidate are outputted, and the command word for confirmation "OK" is not inputted and a inputted voice is not recognized to be "OK", the number m of repetitions is updated by one (step 51), and it is again determined whether or not the number m of repetitions is larger than the predetermined number M of times (step 52). If the number m of repetitions is larger than the predetermined number M of times, the contents of the recognition result memory 32 are cleared and the candidate order n and the number m of repetitions are reset (step 54), to terminate this operation.

Although in the above described two embodiments, command words "OFF-HOOK" and "OK" are inputted in order to perform off-hook and confirming operations, another command word may be used. In addition, function keys for commands may be provided in each of the key inputs 34 and 9 in the parent set and the child set to perform off-hook and confirming operations by key input.

Figure 5A:
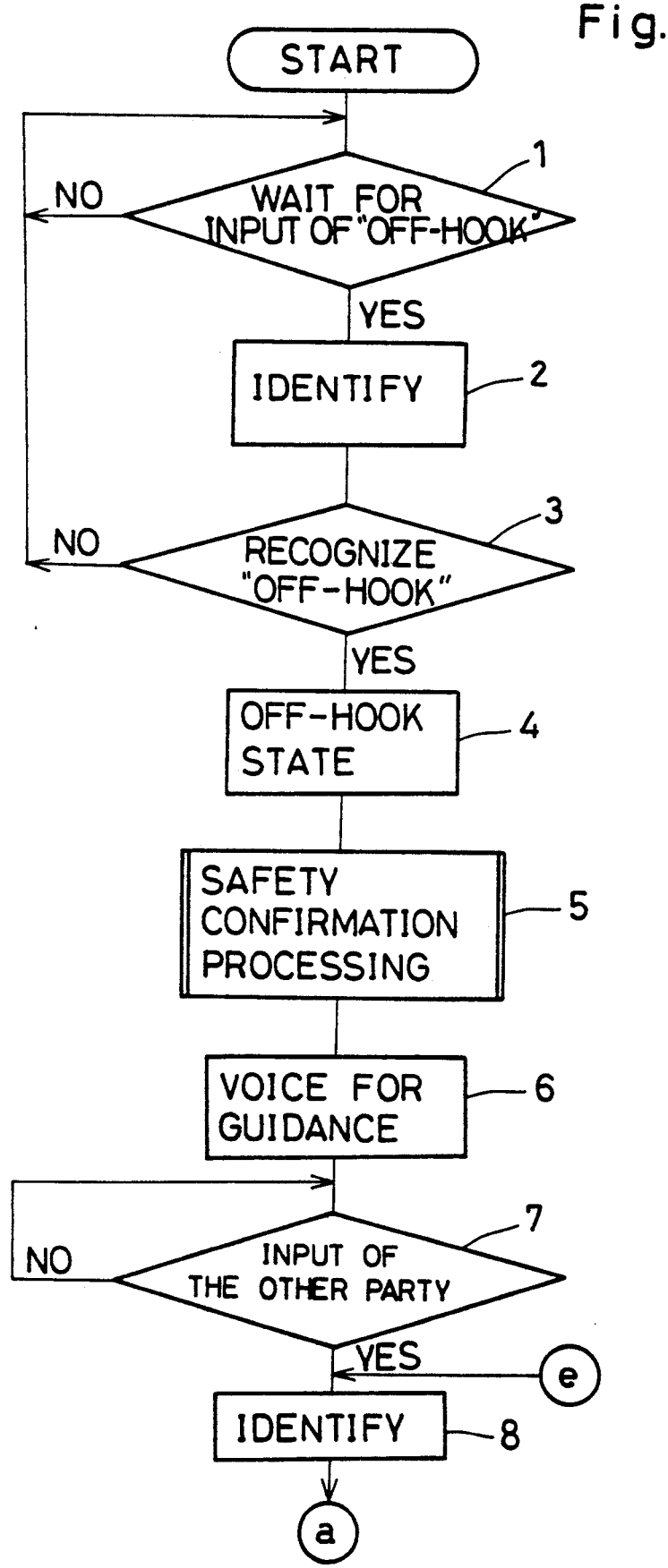
FIGS. 5A, 5B and 5C are flow charts showing the procedure of another call processing.
Figure 5B:
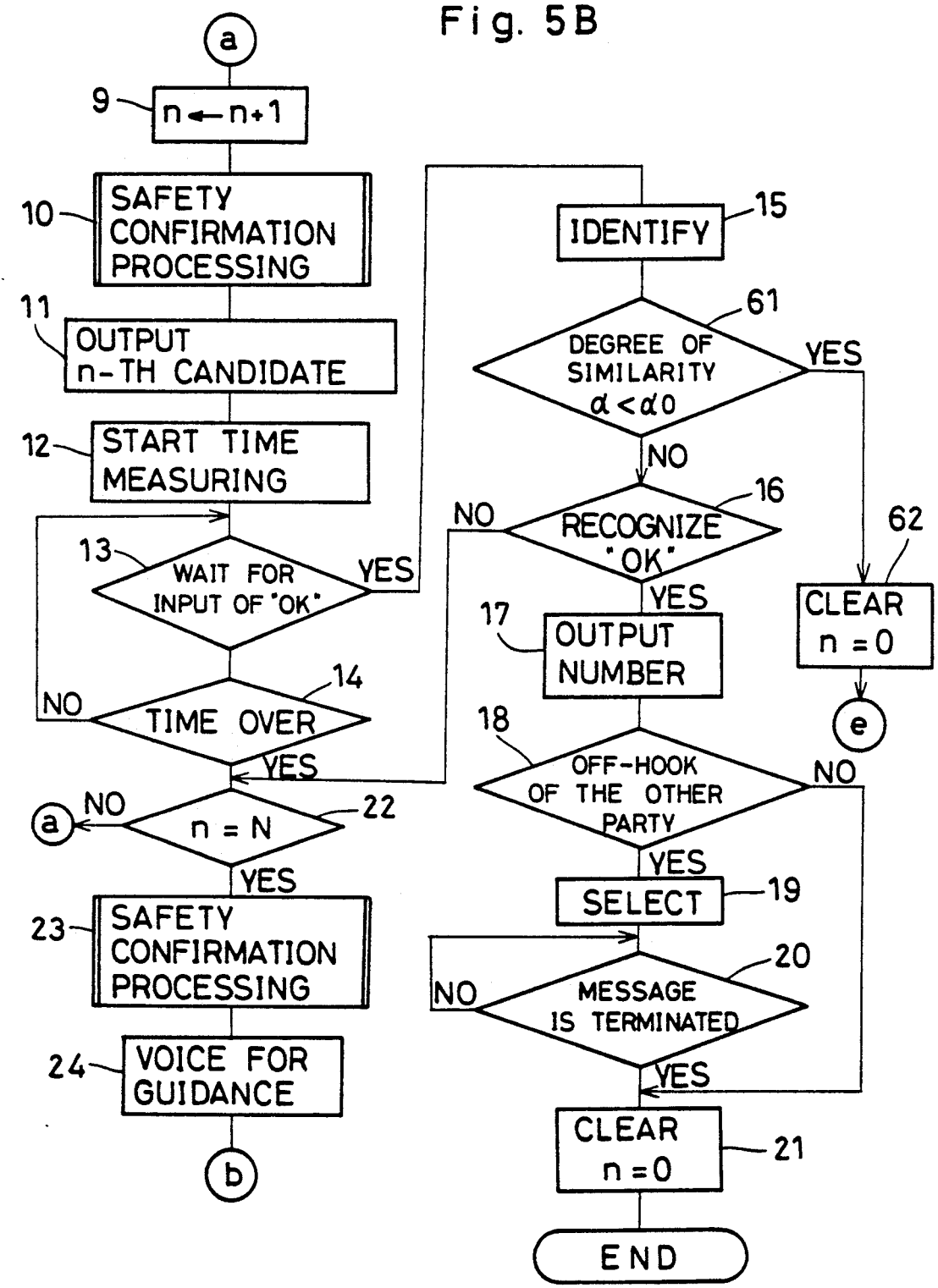
Figure 5C:
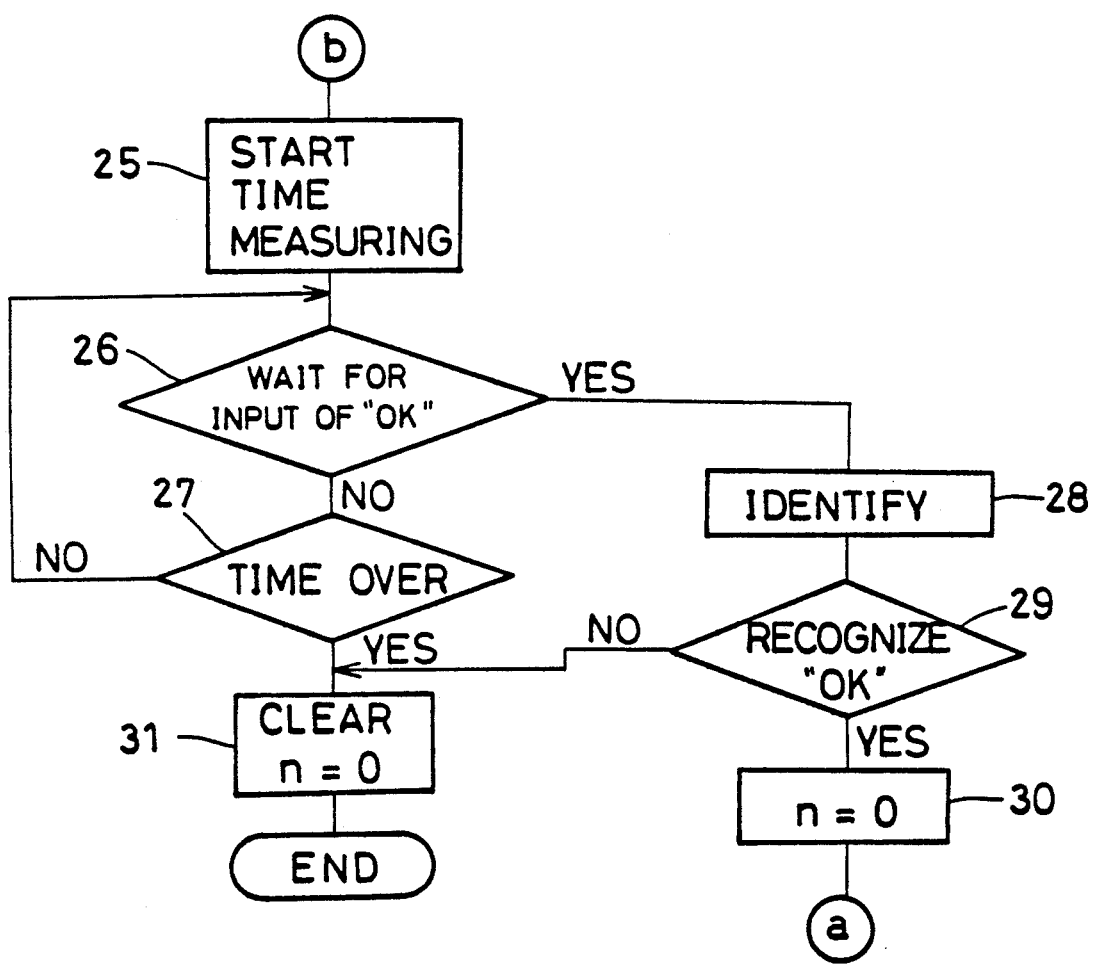

Referring to FIGS. 5A, 5B and 5C, there is shown the procedure for calling processing by the control portion 30 according to still another embodiment of the present invention. In FIGS. 5A, 5B and 5C, the same reference numerals are assigned to like steps as those in FIGS. 3A, 3B and 3C and, the description thereof is not repeated. The processing according to the present embodiment is the same as the processing shown in FIGS. 3A, 3B and 3C except that the steps 61 and 62 are added.

Figure 3A:
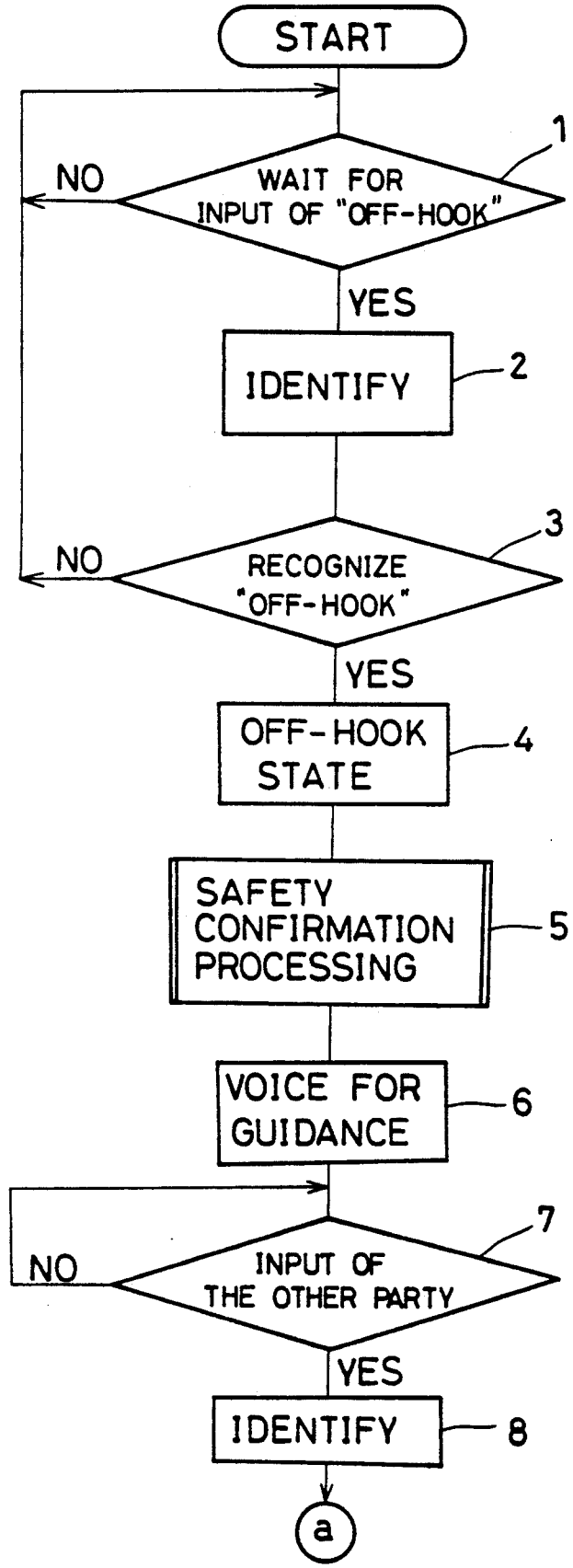
Figure 3C:
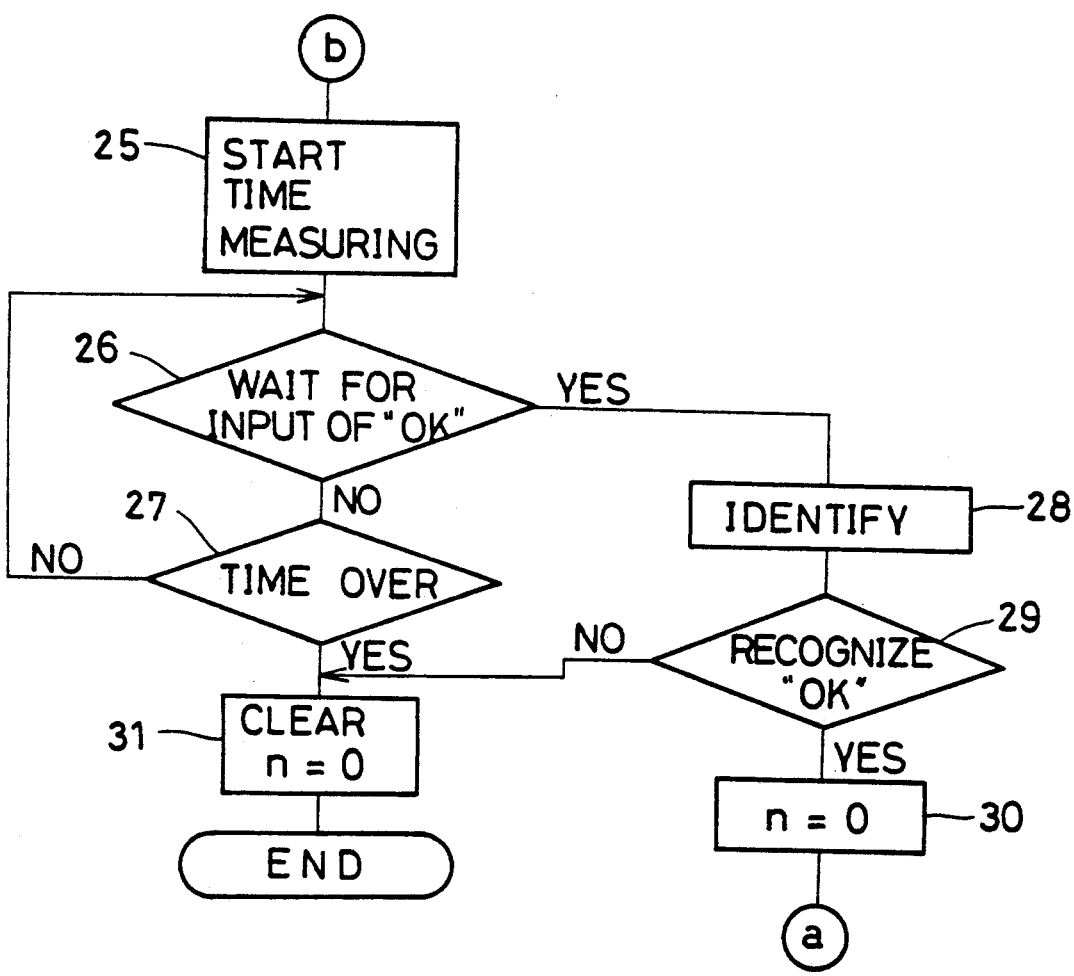

In the present embodiment, if a command word for confirmation "OK" is not inputted with respect to the name of a called party outputted, the next candidate called party name is outputted as shown in FIGS. 3A, 3B and 3C.

However, if the name of a desired called party is inputted again within a constant time period after the name of an erroneously called party was outputted, speech recognition of the name of the called party is automatically performed again on the basis of this inputted voice (see steps 61 and 62).

More specifically, where the name of a called party, which is, for example, the first candidate, is outputted in step 11 but it is different from that desired by a user, if the user inputs the name of the called party again, its inputted voice pattern is stored in the input voice pattern memory 45. The inputted voice pattern is compared with reference patterns of all command words in the second reference pattern memory 44, to examine the degrees of similarity therebetween (step 15).

The highest degree $\alpha$ of similarity of the degrees of similarity between each of the reference patterns of the command words and the inputted voice pattern is compared with a predetermined threshold value $\alpha$o for recognizing other parties/command words (step 61). There is a distance in voice spectrum between the name of the called party and the command word. Accordingly, if the name of the called party is inputted as described above, the degree $\alpha$ of similarity between the inputted voice pattern and the reference pattern of the command word is smaller than the threshold value $\alpha$o.

Consequently, the program proceeds from the step 61 to the step 62. In the step 62, the contents of the recognition result memory 32 is cleared and the candidate order n is reset. The program is returned to the step 8. In the step 8, the voice pattern of the name of the called party stored in the input pattern memory 45 in the above described step 15 is compared with reference patterns of all called parties stored in the first reference pattern memory 43, and the names of the called parties are stored in the recognition result memory 32 in the order of decreasing similarity. Then, processing in the step 9 and the subsequent steps are performed.

In a case where the name of the called party outputted in the step 11 is one desired by the user, if the user inputs the command word for confirmation "OK", the degree $\alpha$ of similarity of the inputted voice pattern to the reference pattern of the command word is larger than the threshold value $\alpha$o. The program then proceeds from the step 61 to the step 16. In the step 16, the inputted voice is recognized to be "OK". Consequently, a telephone number corresponding to the name of the called party is outputted (step 17).

Figure 6A:
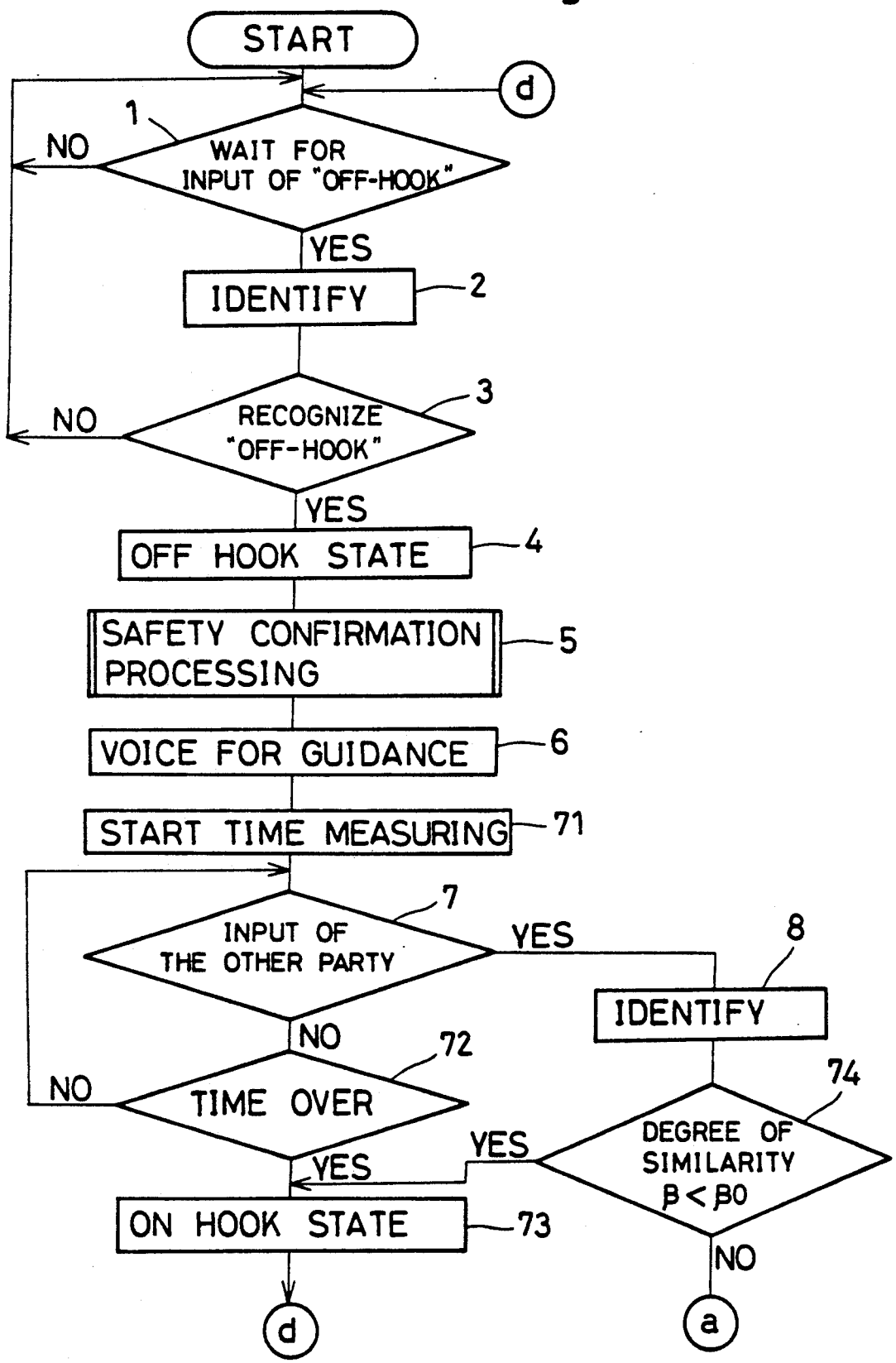
FIGS. 6A and 6B are flow charts showing the procedure of still another call processing.
Figure 6B:
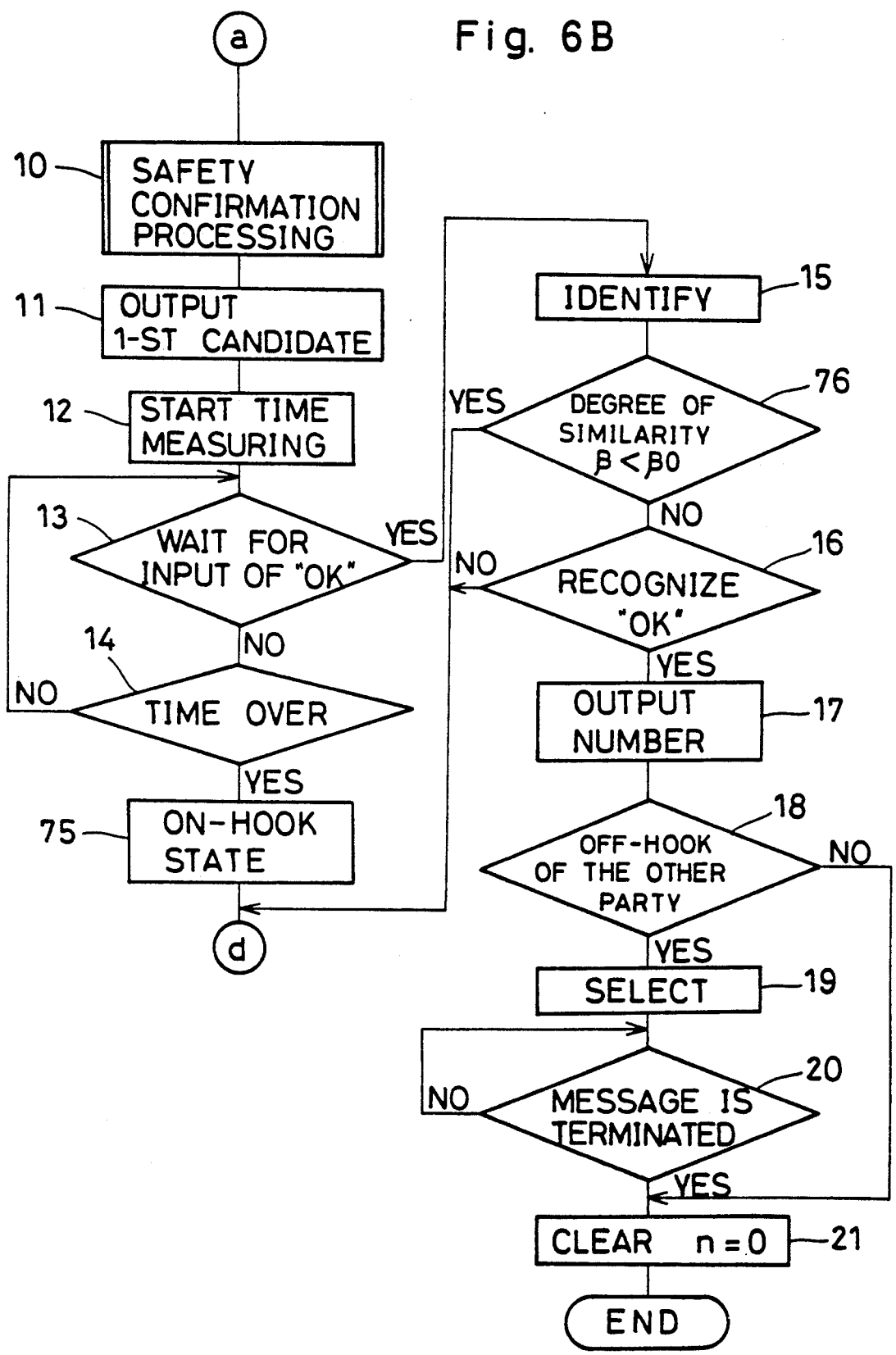

FIGS. 6A and 6B show the procedure of call processing of the control portion 30 according to a further embodiment of the present invention. In FIGS. 6A and 6B, like reference numerals are assigned to the same steps as those in FIGS. 3A, 3B and 3C and, the description thereof is not repeated.

In the present embodiment, if the names of called parties are recognized, only the name of the called party which is the first candidate is outputted, unlike the case shown in FIGS. 3A, 3B and 3C. Consequently, update processing of the candidate order n of the step 9 shown in FIG. 3B and processing for repeatedly outputting the names of called parties in the step 22 and the subsequent steps are not performed. In the present embodiment, the steps 71 to 76 are added.

If in an off-hook state, voice guidance "Input the name of the other party." is provided in the step 6, an operation of measuring predetermined time is started (step 71). If voice input is not provided within this predetermined time period (step 72), the telephone line is brought into an onhook state (step 73) and, the program is returned to the step 1, resulting in a state in which a command word for off-hook is awaited.

If a voice is inputted within the above described time period (step 7), its inputted voice pattern is compared with reference patterns of all called parties in the first reference pattern memory 43 (step 8).

Then, the highest degree $\beta$ of similarity out of the degrees of similarity between the reference patterns of the called parties and the inputted voice pattern is compared with a predetermined threshold value $\beta$o for recognizing noise or command words (step 74).

When the degree $\beta$ of similarity is smaller than the threshold value $\beta$o, it is determined that voice input is provided due to noise. Consequently, the telephone line enters the on-hook state (step 73) and, the program is returned to the step 1, resulting in a state in which the command word for off-hook is awaited.

If in the above described step 74, the degree $\beta$ of similarity is larger than the threshold value $\beta$o, safety confirmation processing is performed (step 10) and, the name of the called party having the highest degree of similarity (the first candidate) is outputted (step 11) and, an operation for measuring predetermined time is started (step 12).

If voice input is not provided within this predetermined time period (step 14), the telephone line is returned to the on-hook state (step 75) and, the program is returned to the step 1, resulting in a state in which the command word for off-hook is awaited.

If a voice is inputted within the above described predetermined time period (step 13), its inputted voice pattern is compared with the reference patterns of all the command words in the second reference pattern memory 44 (step 15).

The highest degree $\beta$ of similarity among the degrees of similarity between the patterns of the command words and the inputted voice pattern is compared with a predetermined threshold value $\beta$o for recognizing noise or command words (step 76).

When the degree $\beta$ of similarity is smaller than the threshold value $\beta$o, it is determined that voice input is provided due to noise. Consequently, the telephone line is brought into the on-hook state (step 75) and, the program is returned to the step 1, resulting in a state in which the command word for off-hook is awaited.

In the above described step 76, when the degree $\beta$ of similarity is larger than the threshold value $\beta$o, it is determined whether or not the inputted voice is "OK" (step 16). When the inputted voice is not recognized to be "OK", the telephone line is brought into the on-hook state (step 75) and then, the program is returned to the step 1, resulting in a state in which the command word for off-hook is awaited.

In the above described step 75, when the imputted voice is recognized to be "OK", a telephone number corresponding to the name of the called party outputted this time is outputted (step 17).

Figure 7A:
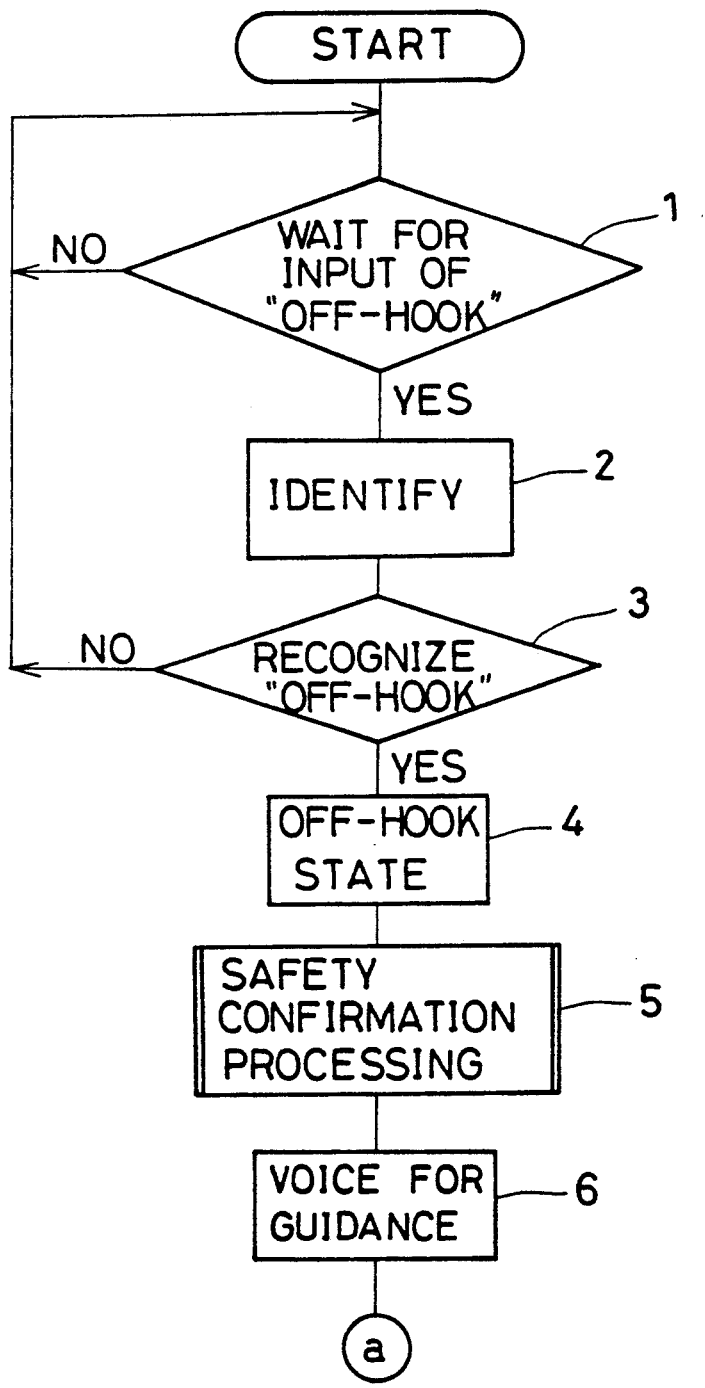
FIGS. 7A, 7B and 7C are flow charts showing the procedure of further call processing.
Figure 7B:
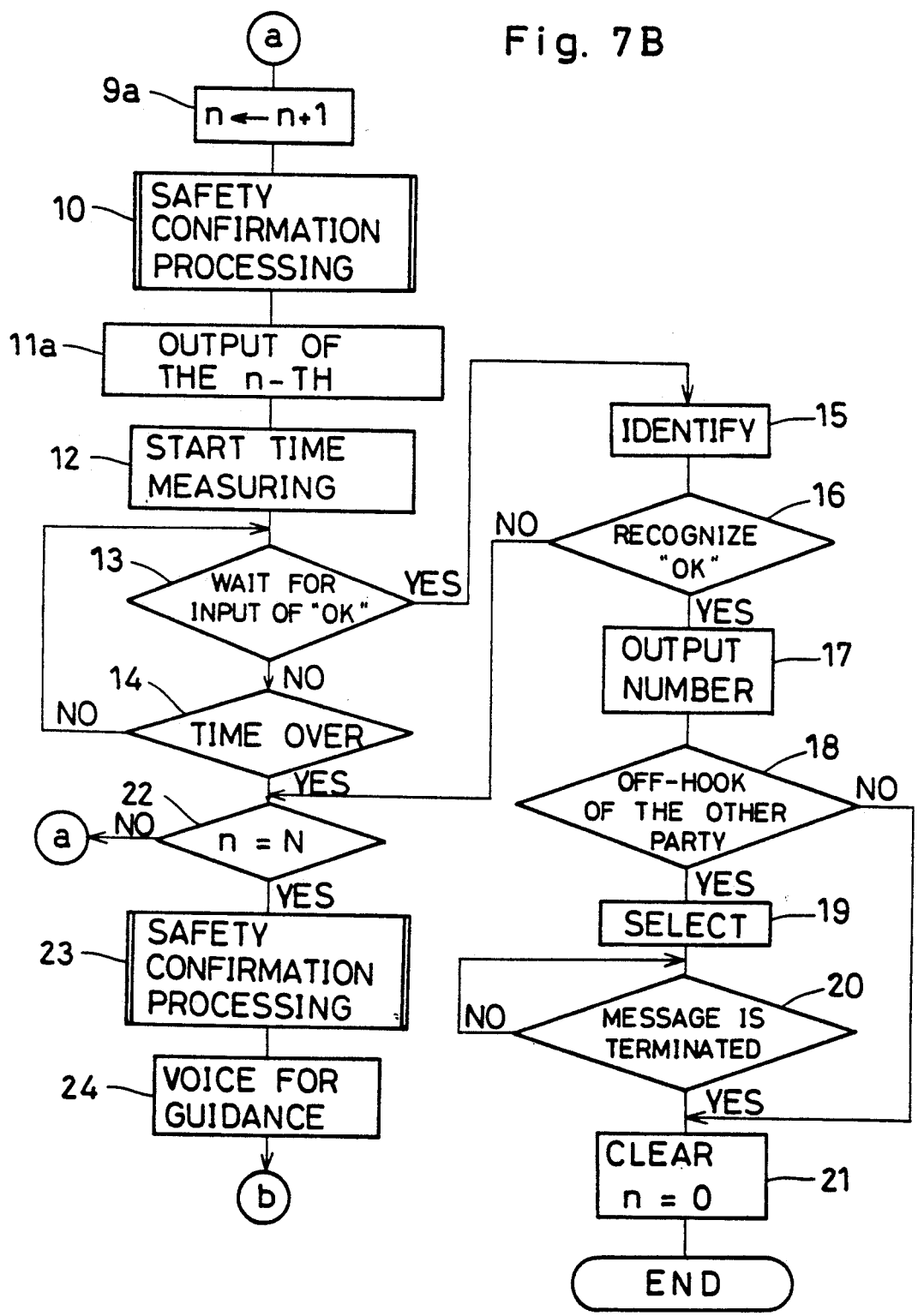
Figure 7C:
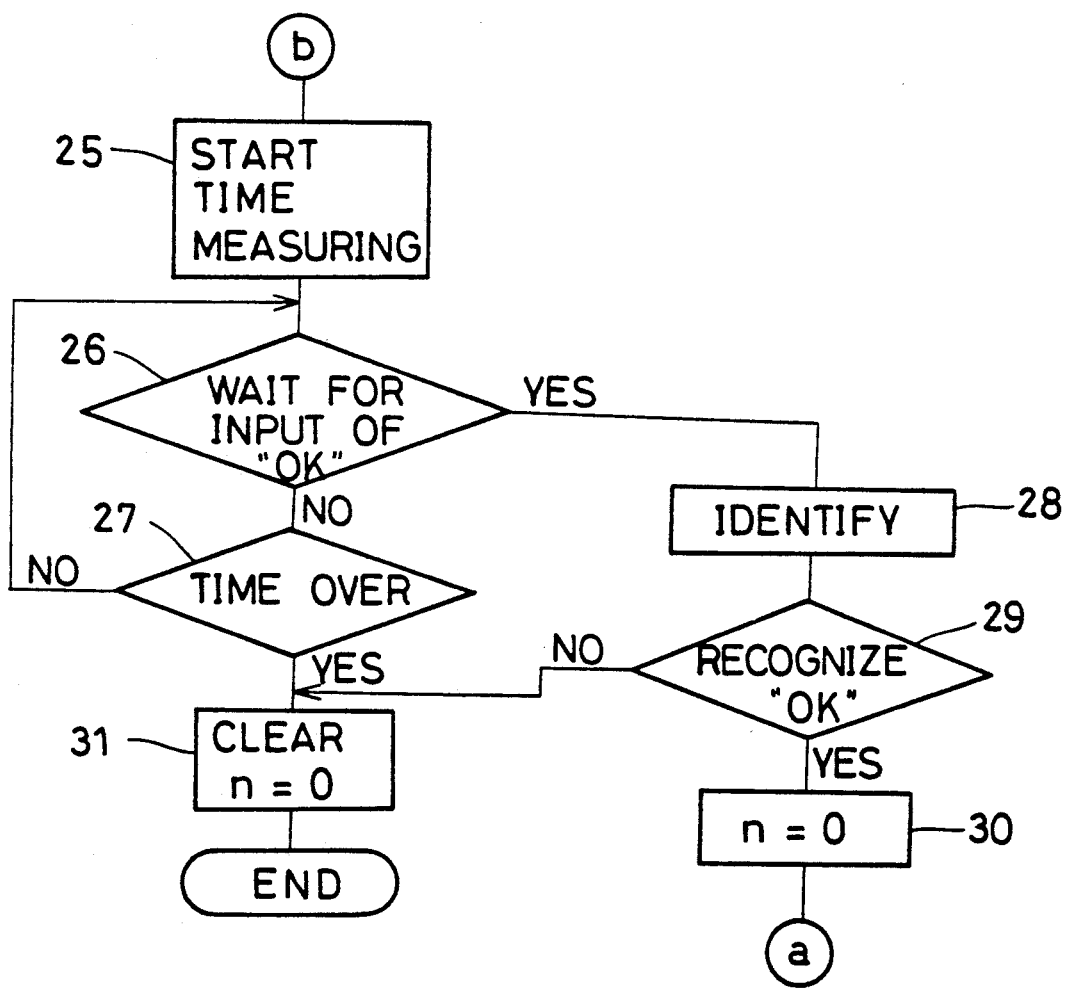

FIGS. 7A and 7B show the procedure of calling processing of the control portion 30 according to a still further embodiment of the present invention. In FIGS. 7A and 7B, like reference numerals are assigned to the same steps shown in FIGS. 3A, 3B and 3C and, the description thereof is not repeated.

In the processing shown in FIGS. 3A, 3B and 3C, the names of the called parties are sequentially outputted beginning with the first candidate based on the results of the recognition of the inputted voice. In the present embodiment, on the other hand, the names of called parties are not inputted. Alternatively, the names of the called parties are outputted in a predetermined order. Consequently, processing of waiting for the name of the called party to be inputted in the step 7 shown in FIG. 3B and processing of the speech recognition in the step 8 are not performed.

Furthermore, in a step 9a corresponding to the step 9 shown in FIG. 3B, not the candidate order based on the results of speech recognition but a predetermined order n is updated. Consequently, in a step 11a corresponding to the step 11 shown in FIG. 3B, the name of the n-th called party in a predetermined order is outputted. FIGS. 7A and 7B are the same as FIGS. 3A, 3B and 3C except for the foregoing hence, the detailed description thereof is not repeated.

Although in the present embodiment, command words "OFF-HOOK" and "OK" are inputted so as to perform off-hook and confirming operations, another command word may be used. In addition, function keys for commands may be provided in each of the key input portions 34 and 9 in the parent set and the child set to perform off-hook and confirming operations by key input.

In all of the above described embodiments, the telephone may be adapted to be automatically brought into an off-hook state if a voice input unit (a handset or microphone) is removed from its steady position as with an ordinary telephone or to be brought into the off-hook state by key input or voice input with the microphone or the handset in its steady position.

Additionally, although in the above described embodiments, the present invention is applied to a wireless automatic dial telephone, it goes without saying that the present invention can be applied to other automatic dial telephone.

Although the present invention has been described and illustrated in detail, it is clearly understood that this is by way of illustration and example only and is not to be taken as a limitation. The spirit and scope of the present invention is limited only by the terms of the appended claims.

What is claimed is:

1. An automatic dial telephone by which a user can voice initiate a call to a selected station and/or party, the automatic dial telephone comprising:
   first means for storing a plurality of discrete voice reference patterns, each discrete voice reference pattern representing a party to be called;
   second means for storing a telephone number for each such party;
   third means for storing a user voice reference pattern representing a command for confirmation;
   means for comparing a voice input pattern with discrete voice reference patterns similar thereto to obtain a list of discrete voice reference patterns similar to the voice input pattern;
   means for outputting audible signals, representing the discrete voice reference patterns from the list of discrete voice reference patterns, in order of descending similarity to the voice input pattern, said outputting means including pause means, to produce a pause period following each audible signal output, for a user to input a user voice signal command for confirmation of the identity of the party to be called;
   said command for confirmation operating to stop said outputting means from outputting audible signals representing any discrete voice reference patterns remaining on the list of discrete voice reference patterns following an output of an audible signal, representing a discrete voice reference pattern from the list of discrete voice reference patterns, which is followed by said command for confirmation; and
   means for selecting and transmitting, as a signal, the telephone number of the identified party to be called.

2. The telephone of claim 1, further comprising control means for orienting the telephone to an off-hook condition for reception thereby of a voice input which is denotive of a specific party to be called;
   said third means for storing having stored therein a user voice reference pattern for a command for off-hook;
   said means for comparing operating to recognize said user voice reference pattern for said command for off-hook; and
   means for operating the control means, responsive to said comparing means, for causing said telephone to be placed off-hook.

3. The telephone of claim 1, further comprising means for repeating the audible signal output.

4. The telephone of claim 1, further comprising means for generating a signal upon failure to recognize a command for confirmation which indicates such failure to the user.

5. The telephone of claim 1, as embodied in a motor vehicle, the motor vehicle including vehicle operating systems,
   the operating systems having normal and abnormal condition states,
   the abnormal states being indicative of an accident potential operating condition,
   the telephone including means for detecting the abnormal states, and
   the telephone including means for inhibiting the voice output during the abnormal states.

6. The telephone of claim 1, in which said outputting means includes means for producing a synthesized voice according to a recognition result, said synthesized voice being effective to output ones of said plurality of discrete voice reference patterns in descending order of similarity to the voice input pattern.

7. The telephone of claim 1, further including means for storing voice synthesis data for a plurality of parties to be called for voice synthesis thereof.

8. The telephone of claim 1, further including means comprising a key input portion for inputting a user command for confirmation of the identity of the party to be called.

9. The telephone of claim 1 further comprising:
   a child set for communicating between the user and a parent set,
   the child set including a microphone for receiving voice inputs from the user, a key for key signal inputs, and means for converting the voice and key inputs into radio frequency signals for transmission to the parent set,
   the child set further including means for receiving radio frequency signals from the parent set,
   the parent set also including transmitting means and means for converting the parent set radio frequency signals into voice signals to the user,
   the parent set including means for receiving user inputs transmitted from the child set, the parent set also including a keypad for receiving user key signal inputs, and
   the parent set further including means for controlling a telephone channel and for communicating between the child set and parties to be called.

10. An automatic dial telephone by which a user can voice initiate a call to a selected station and/or party, the automatic dial telephone comprising:

first means for storing a plurality of discrete voice reference patterns, each discrete voice reference pattern representing a party to be called;

second means for storing a telephone number for each such party;

third means for storing a user voice reference pattern representing a command for confirmation;

means for comparing a voice input pattern, denotive of a specific party to be called, with stored discrete voice reference patterns representing a party to be called similar thereto;

means for outputting audible signals to the user indicative of parties represented by stored discrete voice reference patterns in descending order of similarity to the voice input pattern, the means for outputting including pause producing means operable following each audible signal to produce a pause period for a user to input a voice signal command for confirmation of the identity of the party to be called;

means for comparing a voice input pattern, denotive of a specific user voice signal command, with stored user voice reference patterns representing user voice signal commands similar thereto;

means for determining the degree of similarity between said voice input pattern, denotive of the specific party to be called, and of the specific user voice signal command, respectively with each of the stored plurality of discrete voice reference patterns representing parties to be called and the stored user voice reference patterns representing user voice signal commands, and including means for determining which of said voice reference patterns has a degree of similarity to said voice input pattern that is within a predetermined threshold;

means for selecting and transmitting as a signal the telephone number of the identified party to be called when the user voice signal command for confirmation is within the predetermined threshold; and means for repeating comparison of the input voice pattern, denotive of the specific party to be called, and of the specific user voice signal command, respectively with the stored plurality of discrete voice reference patterns representing parties to be called and the stored user voice reference patterns representing user voice signal commands when the degree of similarity is outside of the predetermined threshold.

11. An automatic dial telephone by which a user can voice initiate a call to a selected station and/or party, the automatic dial telephone comprising:

first means for storing a plurality of discrete voice reference patterns, each discrete voice reference pattern representing a party to be called;

second means for storing a telephone number for each such party;

third means for storing a plurality of user voice reference patterns;

said plurality of user voice reference patterns representing a plurality of commands;

said plurality of commands including commands for confirmation and for off-hook;

means for orienting the telephone to an off-hook condition for reception thereby of an input denotive of a specific party to be called, when a user voice input pattern for off-hook is recognized;

means for placing the telephone to an on-hook condition, wherein the telephone awaits an off-hook command, when a user voice signal is not input within a first predetermined pause period following the off-hook command;

means for comparing a voice input pattern, denotive of a specific party to be called, with a stored plurality of discrete voice reference patterns similar thereto when the telephone is in an off-hook state;

means for outputting an audible signal to the user indicative of a party represented by a stored voice reference pattern which is most similar to the voice input pattern, denotive of a specific party to be called, and including pause producing means operable following the audible signal to produce a second pause period for a user to input a voice signal command for confirmation of the identity of the party to be called;

means for returning the telephone to an on-hook condition when the voice signal command for confirmation is not input during the second pause period; and means for selecting and transmitting as a signal the telephone number of the party to be called.

12. An automatic dial telephone by which a user can voice initiate a call to a selected station and/or party, the automatic dial telephone comprising:

first means for storing a plurality of discrete voice reference patterns, each discrete voice reference pattern representing a party to be called;

second means for storing a telephone number for each such party;

third means for storing a plurality of user voice reference patterns;

said plurality of user voice reference patterns representing a plurality of commands;

said plurality of commands including commands for confirmation and for off-hook;

means for comparing a voice input pattern, denotive of a command, with a stored plurality of user voice reference patterns;

said stored plurality of user voice reference patterns including a stored voice reference pattern representing a command for off-hook;

means for enabling a control means when the means for comparing recognizes a voice input pattern for off-hook as stored in the second means for storing with the telephone in an on-hook condition, wherein the telephone awaits an off-hook command;

means for orienting the telephone to an off-hook condition for reception thereby of a voice input pattern denotive of a specific party to be called;

first means for determining a degree of similarity between the stored user voice reference pattern representing the command for off-hook and the voice input pattern, including means for determining that the degree of similarity is within a predetermined threshold;

the first means for determining including means for returning the telephone to the on-hook condition when the degree of similarity is outside the predetermined threshold;

means for comparing a voice input pattern, as an input denotive of a specific party to be called, with a stored plurality of discrete voice reference patterns similar thereto with the telephone in an off-hook state;

means for outputting a plurality of audible signals to the user, indicative of parties represented by stored discrete voice reference patterns, in descending order of similarity to the voice input pattern;

said means for outputting including pause producing means effective, following each one of said plurality of audible signals, to produce a pause period for a user to input a voice signal command for confirmation of the identity of the party to be called;

second means for determining the degree of similarity between the stored user voice reference pattern, representing a command for confirmation, and said voice signal command, including means for determining that the degree of similarity is within a predetermined threshold;

means for selecting and transmitting as a signal the telephone number of the identified party to be called; and the second means for determining including means for returning the telephone to the on-hook condition when the degree of similarity is outside the predetermined threshold.

13. An automatic dial telephone comprising:

means for storing a first plurality of voice patterns each denotive of a name of a party to be called and a related telephone number;

means for storing a second plurality of voice patterns each denotive of a command;

said second plurality of voice patterns including at least an off-hook command pattern and a confirmation command pattern;

means, effective when said telephone is on-hook, for comparing a voice input pattern with said off-hook command pattern;

means responsive to a similarity of said voice input pattern and said off-hook command pattern being within a predetermined threshold, for placing said telephone off-hook;

means, effective when said telephone is off-hook, for comparing a voice input pattern with said first plurality of voice patterns, and for outputting a signal to a user indicative of a one of said first plurality of voice patterns most similar to said voice input pattern;

means effective, following said outputting a signal, for comparing a further voice input pattern with said confirmation command pattern and, if said comparing indicates a similarity within a predetermined threshold, for dialing said related number; and means for placing said telephone on-hook if a similarity between said further voice input pattern and said confirmation command pattern is outside said predetermined threshold.

* * * * *

UNITED STATES PATENT AND TRADEMARK OFFICE
CERTIFICATE OF CORRECTION

PATENT NO. : 5,301,227
DATED : Apr. 5, 1994
INVENTOR(S) : Soichi Kamei, et al

It is certified that error appears in the above-indentified patent and that said Letters Patent is hereby corrected as shown below:

On title page, item [73] "Sanyo Electic Co., Ltd." should read --Sanyo Electric Co., Ltd.--

Signed and Sealed this

Eighth Day of November, 1994

Attest:

BRUCE LEHMAN

*Attesting Officer*     *Commissioner of Patents and Trademarks*